Figure 1:
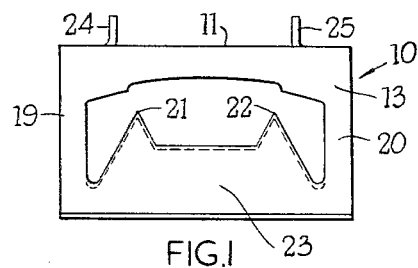

Sept. 28, 1965 C. A. SECKERSON 3,208,119
FASTENERS

Filed March 20, 1963 2 Sheets-Sheet 1

Inventor
Clifford A. Seckerson
by Malcolm W. Fraser
attorney

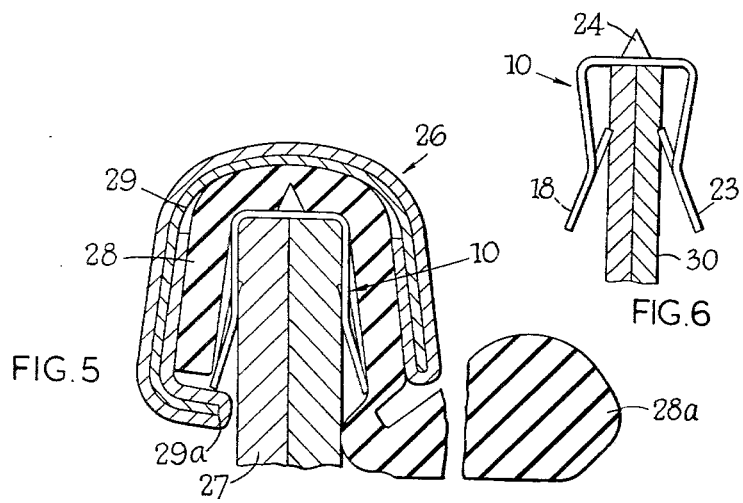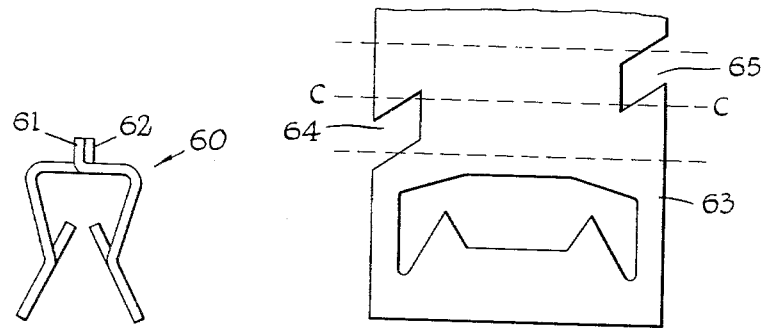

United States Patent Office
3,208,119
Patented Sept. 28, 1965

3,208,119
FASTENERS
Clifford Alexander Seckerson, Iver Heath, England, assignor to United-Carr Incorporated, a corporation of Delaware
Filed Mar. 20, 1963, Ser. No. 266,725
Claims priority, application Great Britain, Mar. 22, 1962, 11,092/62
2 Claims. (Cl. 52—718)

The present invention relates to an improved fastener which is particularly although not exclusively suitable for securing beading or a sealing strip to a metal flange.

It is often necessary in the car industry to cover the edge of a metal flange with a decorative or sealing strip.

A particular instance of such an assembly is found around the opening of a car door where it is necessary to cover the metal flanges against which the door is shut with a sealing strip to ensure that the door is draughtproof. The sealing strip is of channel section and is held on to the flange by a plurality of substantially U-shaped fasteners which embrace the edge of the flange.

The thickness of the flanges to be covered may vary within the same car and may also vary along the length of the one flange.

Where the flange is abnormally thick it is very often the case that the limbs of the U-shaped fastener which embrace the flange are splayed open and this is reflected in an unsightly bulging of the bearing or sealing strip.

It is consequently desirable to provide a fastener which can be used on flanges of varying thickness without causing unsightly bulging of the covering beading or sealing strip at any point and it is an object of the present invention to provide such a fastener.

According to the invention there is provided a resilient fastener formed from a single strip of material to U-shape so as to have a web and two limbs, at least one of the limbs being formed with a window, an edge of which is formed as a prong or prongs directed towards the web and which is partially bounded by two side arms joining the free end of the one limb to the web, wherein the side arms are directed inwardly towards the opposite limb and are bent outwardly about a line of bending intermediate their length and intermediate the length of the prong or prongs and the arrangement is such that the prong or prongs is or are directed inwardly towards the opposite limb, the free end of the one limb is directed outwardly and outward movement of the prong or prongs causes rotation of the free end of the one limb and the prong or prongs about the said line of bending.

According to a further aspect of the invention there is provided an assembly of a resilient channel section beading having an inwardly directed flange secured to an edge of a panel with the aid of a plurality of fasteners as defined in the preceding paragraph, wherein the limbs of each fastener embrace the edge of the panel, the resilient strip is engaged over the fasteners and the arrangement is such that the prong or prongs in each fastener prevent withdrawal of the fasteners from the panel edge and the inwardly directed flange of the beading is engaged around the outwardly directed free end of the one limb of each fastener to retain the beading thereto.

Figure 2:
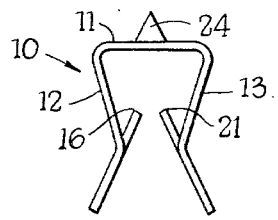
Figure 3:
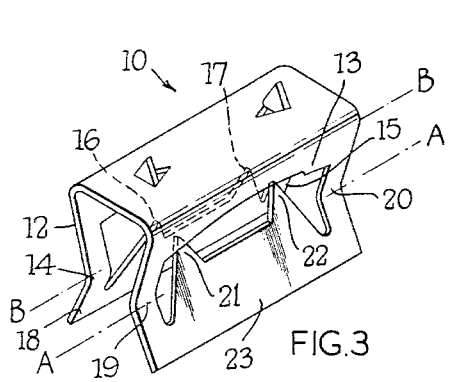
Figure 7:
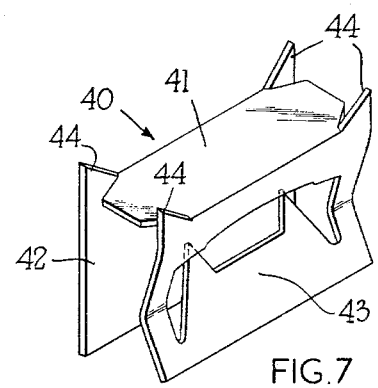
Figure 4:
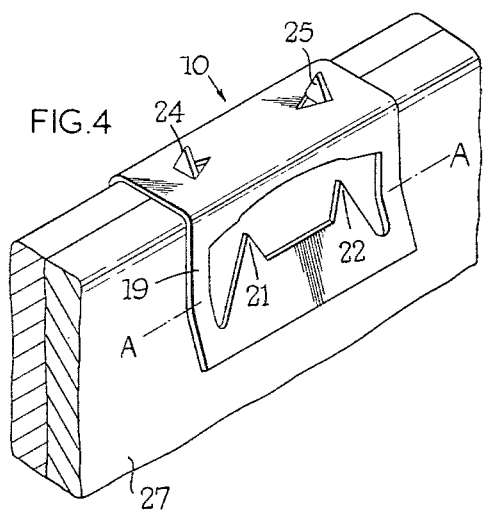
Figure 8:
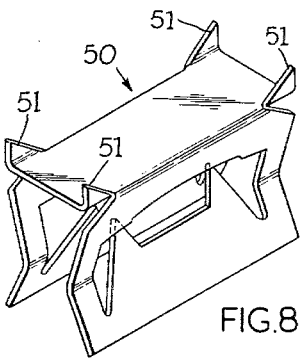

Preferred forms of the invention will now be described with reference to the accompanying drawings, in which:

FIGURES 1, 2 and 3 are respectively a side elevation, end elevation and perspective view of a fastener, FIGURE 4 is a perspective view of the fastener of FIGURES 1 to 3 attached to a metal flange, FIGURE 5 is an end elevation showing an assembly of the fastener of FIGURES 1 to 3 attaching a sealing strip to the flange of FIGURE 4, which is shown in cross-section, FIGURE 6 is an end elevation partly in cross-section showing the fastener of FIGURES 1 to 3 attached to a relatively thin flange, FIGURES 7 and 8 are perspective views of two further embodiments of the fasteners of FIGURES 1 to 3, FIGURE 9 is an end elevation of yet a further embodiment, and FIGURE 10 is a plan view showing a part of the strip from which the fastener of FIGURE 9 is formed.

In FIGURES 1 to 6 a fastener is indicated generally at 10. The fastener 10 is sheared and bent to the shape shown from a single strip of metal which after manufacture is rendered resilient and rustproof in any known manner.

The fastener 10, as best shown in FIGURES 1 to 3, is of substantially U-shape and has a web 11 and two limbs 12 and 13.

A part of the material of the limb 12 is sheared away to leave, a window 12a which is partly bounded by side arms 14 and 15 and the lower edge of which forms prongs 16 and 17. The prongs 16 and 17 are integral with the free end 18 of the limb 12 and are directed towards the web 11.

A window 13a is sheared from the limb 13 in a similar manner to leave side arms 19 and 20 and prongs 21 and 22 which are integral with the free end 23 of the limb.

The side arms 14, 15 and 19, 20 are directed inwardly towards each other and are then bent outwardly about lines of bending A—A and B—B respectively which lie intermediate the length of the side arms and the adjacent prongs, as shown in FIGURE 3.

The prongs in each limb lie in the same plane as the free end of the limb and as a result of the outward bending of the side arms the prongs are inwardly directed and the free end of each limb is outwardly directed.

Claws 24 and 25 are sheared and bent from the web 11 so as to be directed away from the web in substantially the opposite direction to that of the limbs 12 and 13.

A plurality of the fasteners 10 are used to secure a sealing strip, indicated generally at 26 in FIGURE 5 to an edge of a metal flange 27.

The sealing strip 26, which is of a type in common use in the car industry comprises an inner strip 28 formed from any flexible material such as rubber and an outer strip 29 formed from a relatively stiff but resilient material such as mild steel.

The outer strip 29 is of channel section as shown, having a web and two limbs one of which is bent inwardly to form a flange 29a and it is covered, as shown, with a suitable cloth material to give it a pleasing and decorative finish.

The inner strip 28 is formed so as to have a portion of channel section which will seat in the outer strip 29 and an integral pad 28a which in the final assembly projects from the outer strip. When in position around a door opening in a vehicle the pad 28a is intended to act as a buffer and seal against which the door of the vehicle is shut.

In order to make the assembly shown in FIGURE 5 the inner strip 28 is inserted into the outer strip 29 and a plurality of the fasteners 10 are then inserted, at spaced intervals, web first into the inner strip 28. Each fastener is pushed home until the claws 24 and 25 which project from the web of each fastener bite into the web of the resilient inner strip 28 and the flange 29a snaps over the adjacent limb of the fastener to hold it within the sealing strip.

The sealing strip 26, with the fasteners 10 held within it, is then pressed onto the flange 27 so that each fastener embraces the flange.

In the final assembly the edge of the flange buts against the web of each fastener, the outer strip 29 is under tension and held securely to each fastener by the flange 29a, and the prongs 16, 17, 21 and 22 in each fastener bite into the flange 27 to prevent withdrawal of the fasteners and sealing strip from the flange.

The claws 24 and 25 in each fastener hold the inner strip in position and ensure that it cannot work out of the outer strip 29 under the repeated pulling effect created by a door being slammed against the pad 28a.

In FIGURE 6 the fastener 10 is shown attached over a flange 30 which is approximately half as thick as the flange 27.

It will be seen that, when the fastener is attached to the thicker flange 27, as opposed to the thinner flange 30, the distance between the free ends of the limbs 12 and 13 is not increased to the full extent of the difference in the thickness of the two flanges. When the fastener 10 is pressed on to the thicker flange 27 the prongs in each limb are forced outwardly. The outward movement of the prongs causes the side arms in each limb to bend about the lines of bending A—A and B—B so that the free end of each limb is rotated inwardly about the line of bending and compensates for the outward movement of the prongs.

This compensating movement of the free ends of the limbs of the fastener 10 has the advantage that, when the thickness of the flange varies along its length and a fastener is attached over a thickened portion the free ends of the limbs are not forced apart to the extent of the increase in the thickness of the flange and, consequently, any unevenness or bulging in the beading or sealing strip engaged over the fastener is avoided or substantially reduced.

A modification of the fastener 10 is indicated generally at 40 in FIGURE 7.

The fastener 40 is sheared and bent to the shape shown so as to have a web 41 and two limbs 42 and 43. The limb 43 is identical to the limb 13 of the fastener 10 and the web 41 is formed with four claws 44 sheared and bent therefrom so as to be positioned at the corners of the web and directed away from the web in substantially the opposite direction to that of the limbs 42 and 43. The limb 42 is flat and directed away from the web substantially at right angles thereto.

A further modification of the fastener 10 is indicated generally at 50 in FIGURE 8.

The fastener 50 is identical to the fastener 10 except that it is formed with four claws 51, positioned at the corners of the web and sheared wholly from the material of the limbs of the fastener.

Yet a further modification of the fastener 10 is indicated generally at 60 in FIGURE 9.

The fastener 60 is identical to the fastener 10 except in the positioning and formation of the two claws 61 and 62 which project upwardly from the web in the same direction as the claws 24 and 25 of the fastener 10.

The manner in which the claws 61 and 62 are formed is shown in FIGURE 10 which illustrates at 63 a part of a strip of material from which the fastener 60 is in process of being formed.

Two parallel slots 64 and 65 are sheared from the opposite sides edges of the strip in the region which after bending will form the web of the fastener.

The slots 64 and 65 are inclined to the side edges of the strip so as to leave the claws 61 and 62 pointing in opposite directions along the length of the strip. The claws 61 and 62 are then bent up out of the plane of the strip about the line C—C which runs transversely of the strip and the strip is subsequently bent, in any suitable manner to complete the manufacture of the fastener 60.

It will be appreciated that a fastener according to the invention may be provided with a claw or claws projecting to one side of the web which have been sheared wholly or partially from either the web or the limbs of the fastener.

Furthermore, if the fastener is designed to retain a beading or sealing strip which does not have a flexible inner strip the claws may be dispensed with altogether.

In all of the fasteners described above, the combined width of the side arms of each limb (e.g. as measured along the line A—A of FIGURE 3) is preferably considerably less than the width of the limb at its junction with the web, in order to ensure that, when the prongs are forced outwardly, a greater degree of bending occurs along the lower line of bending (e.g. the line A—A of FIGURE 3) than occurs along the junction line.

What I claim is:

1. A resilient fastener for attaching strip beading to a flange and comprising a single strip of material bent to an approximate U-shape so as to have two limbs joined by a web, each limb being apertured to have a transverse end portion joined to the web by two flexible arms and a prong integral and co-planar with one of said transverse end portions and extending rearwardly from the transverse end portion towards the web, the two limbs being directed inwardly and towards each other from the web and the flexible arms in each limb being bent outwardly and away from the opposite limb about a line extending transversely of the limb and passing through the prongs whereby the transverse end portions are directed outwardly and the prongs are directed inwardly and movement of the prongs outwardly away from each other results in a corresponding inward movement of the transverse end portions about the said transverse lines.

2. The combination of a channel-section strip beading having inwardly turned longitudinal flanges attached to a metal flange with the aid of a number of U-shaped fasteners each of which has a web joining two limbs which embrace the flange, each limb being apertured so as to have transverse end portions joined to the web by two flexible arms and two similar prongs integral and co-planar with the transverse end portion and extending rearwardly from the end portion towards the web, the two limbs being directed inwardly and towards each other from the web and the flexible arms of each limb being bent inwardly and towards the opposite limb about a line transverse of the limb and passing through the prongs whereby the transverse end portions of the limb are directed outwardly for engagement with the longitudinal flanges of the beading and the prongs are directed inwardly for biting engagement on the metal flange and whereby outward, parting movement of the prongs by the metal flange results in a corresponding and compensating inward movement of the transverse end portions about the said transverse lines.

References Cited by the Examiner

UNITED STATES PATENTS 2,693,011  11/54  Fernberg _____ 20—69
2,986,793  6/61   Bright _____ 20—69

FOREIGN PATENTS 211,844   11/57  Australia.

HARRISON R. MOSELEY, *Primary Examiner.*

REINALDO P. MACHADO, *Examiner.*